April 16, 1935.  E. J. POOL  1,998,251
FASTENER SECURED STRUCTURE
Filed May 31, 1933
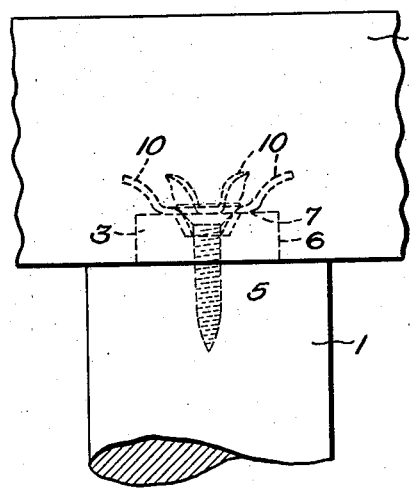
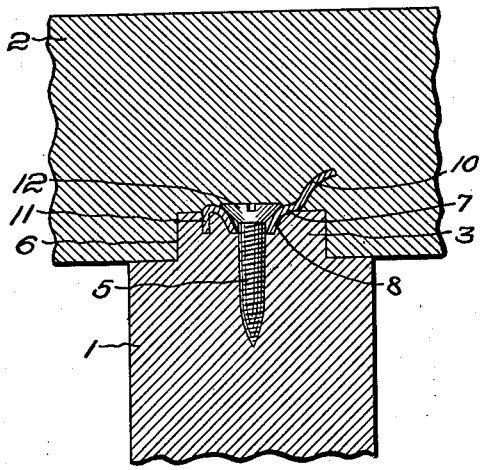
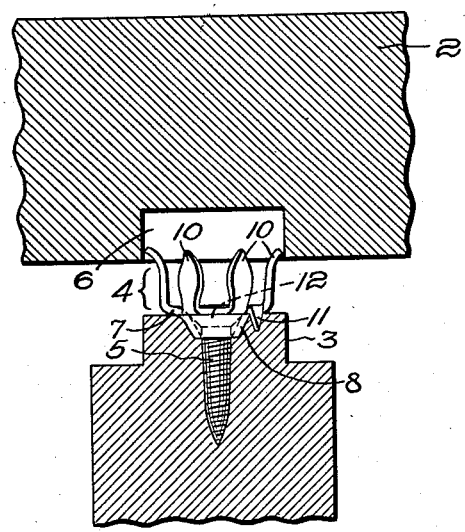
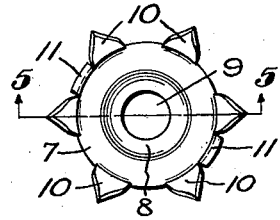
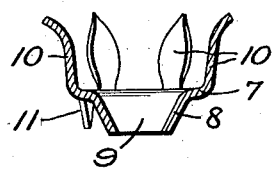
Inventor:
Esson J. Pool,
by Walter S. Jones
Att'y.

Patented Apr. 16, 1935

1,998,251

UNITED STATES PATENT OFFICE 1,998,251

FASTENER SECURED STRUCTURE

Esson J. Pool, Chicago, Ill., assignor to Cinch Manufacturing Corporation, Chicago, Ill., a corporation of Illinois Application May 31, 1933, Serial No. 673,717

3 Claims. (Cl. 20—92)

My invention aims to provide improvements in fastener secured structures and particularly wooden structures having two parts to be secured permanently together.

In the drawing which illustrates a preferred embodiment of my invention:—

Figure 1 is a side elevation of portions of two members secured together by my improved fastener member;

Fig. 2 is a vertical section through the structure shown in Fig. 1;

Fig. 3 is a part section and part elevational view of the structure shown in Fig. 1 showing the manner in which the parts are assembled and then secured together;

Fig. 4 is a plan view of the fastener member; and

Fig. 5 is a section of the fastener member taken on the line 5—5 of Fig. 4.

My invention, as illustrated by the annexed drawing, is particularly, though not exclusively, useful in connection with the construction of furniture such as chairs and other articles of wood which have to have members joined together.

For the purpose of description, let us assume that my invention is shown in connection with securing a chair leg 1 (Fig. 1) to the seat 2 of the chair. The chair leg 1 (Fig. 3) is provided with a bore-entering portion 3 on the end of which is secured a fastener member 4 by means of a screw 5. The chair seat 2 has a bore 6 extending part way through it to receive the bore-entering portion 3, as clearly indicated in Fig. 2.

The fastener member is a very simple device formed from sheet metal and provided with a base 7 from which is pressed a tapered portion 8 (Figs. 2 and 5) having an opening 9 therethrough. At the periphery of the base 7 I have provided a plurality of sharp pointed attaching prongs 10 extending from the base in the opposite direction from the tapered portion 9. The attaching prongs 10 (Figs. 4 and 5) are initially bent outwardly at their ends for purposes hereinafter more fully described. The fastener is also provided with sharp pointed projections 11 extending from the periphery of the base 7 in the opposite direction from the prongs 10 for embedded engagement (Fig. 2) with the bore-entering portion 3.

After the parts of the installation have been initially prepared, the assembly is a relatively easy and quick operation. The fastener member 4 is attached to the free end of the bore-entering portion 3 (Fig. 3) with the tapered portion 8 countersunk into the wood and the base 7 resting against the outer end. The shank of the attaching screw 5 passes through the aperture 9 in the tapered portion 8 and a head 12 seats against the tapered portion 8 thereby holding the fastener member firmly in position. The projections 11 (Fig. 2) are embedded in the bore-entering portion 3 thereby preventing relative rotation between the fastener member and the chair leg 1.

The assembly of the fastener-carrying leg 1 with the seat 2 is thereafter accomplished by entering the fastener into the bore 6, as shown in Fig. 3, and then driving the leg into position, as shown in Fig. 2. Since the attaching prongs 10 have their outer ends bent slightly outwardly, they naturally tend to bend outwardly into curvilineal engagement with the material of the chair seat 2 when driven into position. Thus the attaching prongs 10 spread outwardly and grip the material in such a manner that considerable force is required to remove them after once having been upset in the material of the chair seat 2. Thus the two parts are firmly secured together and interlocked against relative rotation.

As a result of my improved fastening means two members may be secured together quickly and rigidly in a very economical manner and cannot become separated except by the use of abnormal force.

While I have illustrated and described a preferred embodiment of my invention, I do not wish to be limited thereby because the scope of my invention is best defined by the following claims.

I claim:

1. A structure of the class described comprising, in combination, two parts to be secured together, one of said parts having a bore therein extending part way through the part and the other part having a bore-entering portion adapted to fit into said bore and a fastener member secured to the end of said bore-entering portion and having a plurality of bendable attaching prongs having their ends initially bent to embed themselves curvilineally into the first mentioned part beyond the bore when the said bore-entering portion is driven into said bore thereby rigidly to secure the parts together, and said fastener member having a projection embedded in the bore-entering portion to prevent rotation thereof.

2. A structure of the class described comprising, in combination, two parts to be secured together, one of said parts having a bore therein extending part way through the part and the other part having a bore-entering portion adapted to fit into said bore, a fastener securing the two parts together, said fastener having a base portion bearing against the end of the bore-entering portion, a projection extending from said base portion into embedded relation with the bore-entering portion to prevent rotation of the fastener relative to the bore-entering portion and a plurality of bendable attaching prongs extending from said base curvilineally into embedded relation with the first mentioned parts beyond the bore thereby to secure the parts together.

3. A structure of the class described comprising, in combination, two parts to be secured together, one of said parts having a bore therein extending part way through the part and the other part having a bore-entering portion adapted to fit into said bore, a fastener securing the two parts together, said fastener having a base portion bearing against the end of the bore-entering portion, a tapered portion extending from the base and being open at the bottom, an attaching screw having its shank passing through the opening in the tapered portion into the bore-entering portion and having its head entering into and engaging the tapered portion to secure the fastener in position, a plurality of projections extending from said base portion into embedded relation with the bore-entering portion to prevent rotation of the fastener relative to the bore-entering portion and a plurality of bendable attaching prongs extending from said base curvilineally into embedded relation with the first mentioned parts beyond the bore thereby to secure the parts together.

ESSON J. POOL.